(12) United States Patent
Wu et al.

(10) Patent No.: US 12,060,789 B2
(45) Date of Patent: Aug. 13, 2024

(54) SCALING FACTOR FOR CALIBRATING ANTENNAS OF A WELLBORE TOOL

(71) Applicant: Halliburton Energy Services, Inc., Houston, TX (US)

(72) Inventors: Hsu-Hsiang Wu, Sugar Land, TX (US); Yijing Fan, Singapore (SG); Li Pan, Singapore (SG); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 273 days.

(21) Appl. No.: 17/751,994

(22) Filed: May 24, 2022

(65) Prior Publication Data

US 2023/0383643 A1 Nov. 30, 2023

(51) Int. Cl.
*E21B 47/024* (2006.01)
*E21B 49/00* (2006.01)
(Continued)

(52) U.S. Cl.
CPC ............ *E21B 47/024* (2013.01); *E21B 49/00* (2013.01); *G01V 3/30* (2013.01); *G01V 3/38* (2013.01); *G01V 13/00* (2013.01)

(58) Field of Classification Search
CPC ........ E21B 47/024; E21B 47/06; E21B 47/09; E21B 49/00; E21B 21/06; G01V 3/08;
(Continued)

(56) References Cited

U.S. PATENT DOCUMENTS

| 6,389,878 B1 | 5/2002 | Zamfes |
| 7,265,552 B2 | 9/2007 | Bittar |

(Continued)

FOREIGN PATENT DOCUMENTS

| WO | 2011129828 | 10/2011 |
| WO | 2019143362 A1 | 7/2019 |

OTHER PUBLICATIONS

Bittar et al., "First LWD Co-Located Antenna Sensors for Real-Time Anisotropy and Dip Angle Determination, Yielding Better Look-Ahead Detection", Petrophysics, vol. 62, No. 3, Jun. 2021, pp. 296-310.

(Continued)

*Primary Examiner* — Neel D Shah
(74) *Attorney, Agent, or Firm* — Kilpatrick Townsend & Stockton LLP

(57) ABSTRACT

A system can calibrate inconsistencies in a wellbore tool. The system can receive a first set of measurements and a second set of measurements with respect to different electromagnetic antennas. The system can decouple a first multi-components tensor corresponding to the first set of measurements and a second multi-components tensor corresponding to the second set of measurements. The system can determine, using the decoupled first and second multi-components tensors, a scaling factor. The system can apply the scaling factor to a raw measurement received with respect to an electromagnetic antenna of the wellbore tool positioned in a wellbore to decouple a third multi-components tensor or to decoupled components of a fourth multi-components tensor for controlling a wellbore operation.

20 Claims, 6 Drawing Sheets

(51) Int. Cl.
  *G01R 35/00* (2006.01)
  *G01V 3/30* (2006.01)
  *G01V 3/38* (2006.01)
  *G01V 13/00* (2006.01)

(58) Field of Classification Search
  CPC .......... G01V 3/1012; G01V 3/20; G01V 3/26; G01V 3/28; G01V 3/30; G01V 13/00; G01R 35/00
  See application file for complete search history.

(56) References Cited

U.S. PATENT DOCUMENTS

| | | | |
|---|---|---|---|
| 8,274,289 | B2 | 9/2012 | Bittar et al. |
| 8,890,541 | B2 | 11/2014 | Le et al. |
| 11,112,523 | B2 | 9/2021 | Frey |
| 2011/0219853 | A1 | 9/2011 | Henderson |
| 2018/0016857 | A1 | 1/2018 | Shekhar et al. |
| 2020/0256188 | A1 | 8/2020 | Rowe |
| 2020/0408950 | A1* | 12/2020 | Pan .......................... G01V 3/26 |

OTHER PUBLICATIONS

Halliburton Energy Services, Inc., International Search Report and Written Opinion, PCT/US2022/030667, Feb. 14, 2022, 10 Pages.

\* cited by examiner

SCALING FACTOR FOR CALIBRATING ANTENNAS OF A WELLBORE TOOL

TECHNICAL FIELD

The present disclosure relates generally to wellbore operations and, more particularly (although not necessarily exclusively), to a scaling factor for calibrating a wellbore tool.

BACKGROUND

A wellbore can be formed in a subterranean formation for producing and extracting material from the subterranean formation. The material can include hydrocarbon material such as oil and gas, etc. Various wellbore tools can be used to perform various operations with respect to the wellbore. For example, a resistivity tool can be positioned in the wellbore to determine a resistivity with respect to the wellbore. But, the wellbore tools may not be calibrated for performing the wellbore operations. For example, one or more components of the wellbore tools may not be identical, and, without properly calibrating the wellbore tools adjusting for the one or more components, the wellbore tools may not return accurate measurements.

DETAILED DESCRIPTION

Figure 1:
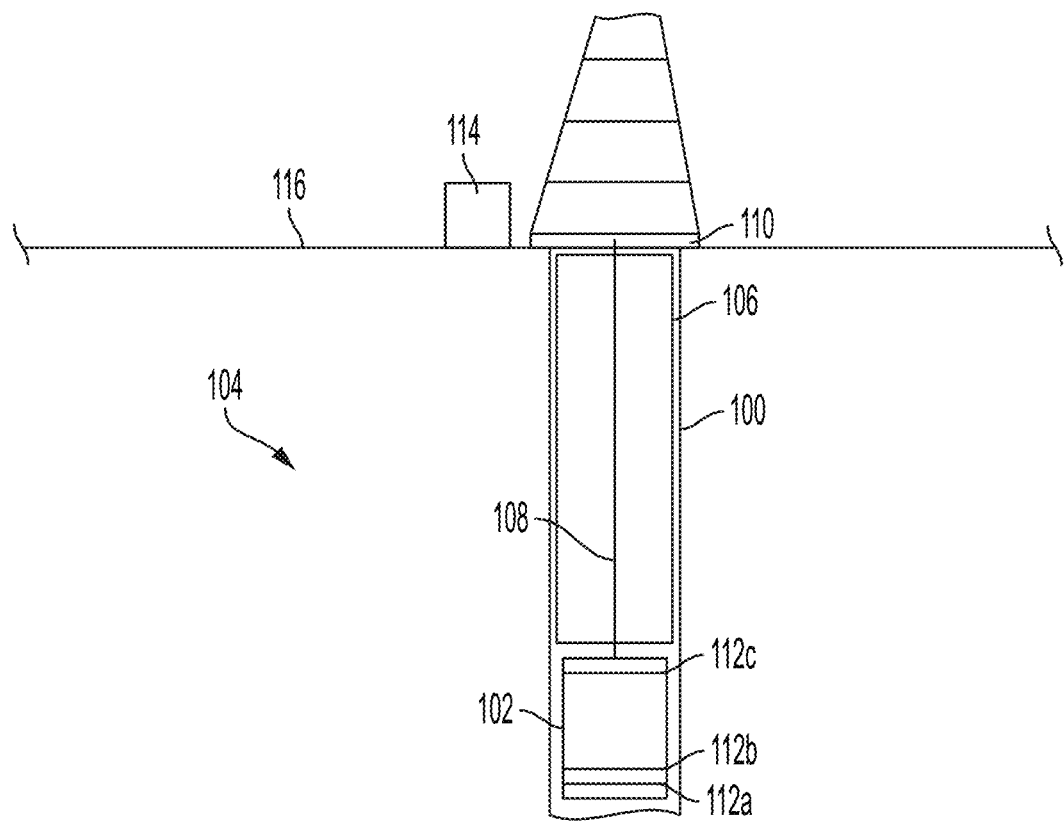
FIG. 1 is a diagram of a wellbore with a wellbore tool that can be calibrated using a scaling factor according to one example of the present disclosure.

Certain aspects and examples of the present disclosure relate to determining a scaling factor for calibrating a wellbore tool. The wellbore tool can include a resistivity logging tool or other suitable wellbore tool that includes two or more electromagnetic antennas such as receivers. The electromagnetic antennas of the wellbore tool may be similar and may be designed to be identical. But, the electromagnetic antennas may differ due to various manufacturing defects, manufacturing tolerances, material variations, and the like. Thus, differences (e.g., different dipole moments, etc.) can exist between the electromagnetic antennas. The scaling factor can be used to adjust (e.g., for inherent or uncontrollable differences between the antennas) measurements made using the electromagnetic antennas. For example, a common or averaged scaling factor can be applied to measurements taken via the one or more of the electromagnetic antennas. In some examples, different scaling factors can be applied to corresponding components of a measurement relating to one or more of the electromagnetic antennas of the wellbore tool.

The scaling factor can be determined using decoupled measurements from the electromagnetic antennas, which may include one or more transmitters, receivers, or a combination thereof. The electromagnetic antennas may transmit or receive data at any suitable frequencies. The decoupled measurements may be taken while the wellbore tool is in air. For example, the wellbore tool can be suspended in an airhang configuration or other suitable configuration for making measurements in air using the wellbore tool. The scaling factor can be applied to one or more measurements taken by the antennas of the wellbore tool that is deployed in a wellbore formed in a subterranean formation for controlling a wellbore operation.

Various wellbore tools can be used to perform wellbore operations. The wellbore tools can include resistivity tools, packing tools, drilling tools, etc. In electromagnetic resistivity logging tools, two tilted antennas with different tool face angles can be similarly arranged as receivers or transmitters. Another tilted antenna can be arranged as a transmitter or receiver and can be different than the two tilted antennas. For example, if the two tilted antennas are receivers, then the tilted antenna can be a transmitter, and vice versa. Voltages measured at the receivers from a transmitter firing can be used to decouple one or more multi-component tensors, which can be used for inversion input relating to measurements of a formation in which the wellbore is disposed.

The antennas can be designed to be identical. For example, the antennas can be designed to include the same dimension and structures (e.g., coils, ferrites, shield, etc.) such that the antennas include an identical dipole moment. But, manufacturing defects, material differences, and the like can cause different dipole moments between the two antennas to exist. Accordingly, the different dipole moments can cause error in the decoupled multi-components tensor, which can cause inefficiencies or mistakes in wellbore operations controlled with the decoupled multi-components tensor.

A scaling factor approach can be used to calibrate the discrepancy between the antennas, for example, having different dipole moments. Measurements can be taken using an airhang calibration technique with different tool face offset angles, which can include a tool face offset angle between the transmitter and the receiver. Two sets of multi-components tensors can be decoupled for two receivers separately, and a scaling factor can be obtained by taking ratio of the two sets of components. Additionally, the scaling factor can be applied to various formation environments. By applying the scaling factor to airhang data and field data, accuracy of decoupled multi-component tensors and other information or outputs relating to the field data can be improved compared to data that does not use or otherwise involve the scaling factor.

The scaling factor approach can reduce amplitude offsets and phase offsets in decoupled multi-components tensors. Using the scaling factor can provide an improved (e.g., compared to techniques not using the scaling factor) azimuth resistivity image and inversion results, which can result in better geo-steering and other suitable improvements. The scaling factor approach can reduce the fluctuation of multi-components tensors with different transmitter and receiver toolface offset angles, and using the scaling factor can provide more consistent and accurate data and results from the wellbore tool.

In some examples, a wellbore tool can include two receivers and one transmitter. In some examples, the wellbore tool can include more than two receivers, fewer than two receivers, more than one transmitter, or any suitable combination thereof. The transmitter can include a tilted transmitter antenna T with a tilted angle $\theta_t$ and tool face angle $\beta$. The receiver can include two tilted receiver antennas with tilted angle $\theta_r$ and different tool face angles $\beta$ and $\beta+\Delta\beta$. An offset angle, TFoffset, between the transmitter and the receiver during assembly can exist. Thus, the receiver tool face angles after assembly can be:

$$\beta_{R1} = \beta + TFoffset \tag{1a}$$

$$\beta_{R2} = \beta + \Delta\beta + TFoffset \tag{1b}$$

where $\beta$ is the tool face angle around the z-axis (longitudinal axis) of the wellbore tool and with respect to an x-axis (vertically orthogonal to the z-axis) of the wellbore tool. $\theta_t$ is a tilted angle of a transmitter, $\theta_r$ is a tilted angle of receiver. $Z_{ij}$ (i=x, y, z; j=x, y, z) is the multi-component tensor to be decoupled from the raw measurements $V_{R1}(\beta)$ and $V_{R2}(\beta)$. The raw measurements may include complex voltages received at the respective electromagnetic antennas or other suitable raw measurements received by the electromagnetic antennas. Since the measurements are made in air, the tool response can be expressed by:

$$V_{R1}(\beta) = \begin{bmatrix} \sin(\theta_t)\cos(\beta) \\ \sin(\theta_t)\sin(\beta) \\ \cos(\theta_t) \end{bmatrix}^T \begin{bmatrix} Z_{xx} & 0 & 0 \\ 0 & Z_{yy} & 0 \\ 0 & 0 & Z_{zz} \end{bmatrix} \begin{bmatrix} \sin(\theta_r)\cos(\beta + TFoffset) \\ \sin(\theta_r)\sin(\beta + TFoffset) \\ \cos(\theta_r) \end{bmatrix} \tag{2a}$$

$$V_{R2}(\beta) = \begin{bmatrix} \sin(\theta_t)\cos(\beta) \\ \sin(\theta_t)\sin(\beta) \\ \cos(\theta_t) \end{bmatrix}^T \begin{bmatrix} Z_{xx} & 0 & 0 \\ 0 & Z_{yy} & 0 \\ 0 & 0 & Z_{zz} \end{bmatrix} \begin{bmatrix} \sin(\theta_r)\cos(\beta + \Delta\beta + TFoffset) \\ \sin(\theta_r)\sin(\beta + \Delta\beta + TFoffset) \\ \cos(\theta_r) \end{bmatrix} \tag{2b}$$

In a homogeneous formation, like in air, no variation of signals at different toolface angles may exist. So, $\beta$ can be set to zero. Accordingly, Equations 2a and 2b can simplified to:

$$V_{R1} = C_{xx}\cos(TFoffset) + C_{zz} \tag{3a}$$

$$V_{R2} = C_{xx}\cos(\Delta\beta + TFoffset) + C_{zz} \tag{3b}$$

where:

$$\begin{cases} C_{xx} = Z_{xx}\sin\theta_t\sin\theta_r \\ C_{zz} = Z_{zz}\cos\theta_t\sin\theta_r \end{cases} \tag{4}$$

The multi-components tensors $C_{xx}$ and $C_{zz}$ can be solved using Equations 3a and 3b concurrently. But, due to manufacturing tolerances, material differences, and the like, there may be differences between the antennas. A factor may exist between $V_{R1}$ and $V_{R2}$ which can result or otherwise cause error in $C_{xx}$ and $C_{zz}$. In order to capture the factor (e.g., to determine the scaling factor) between $V_{R1}$ and $V_{R2}$, measurements can be taken at different toolface offset (TFoffset) angles. Accordingly:

$$\begin{bmatrix} V_{R1}(1) \\ V_{R1}(2) \\ \vdots \\ V_{R1}(n) \end{bmatrix} = C_{xx}^{(1)} \begin{bmatrix} TFoffset(1) \\ TFoffset(2) \\ \vdots \\ TFoffset(n) \end{bmatrix} + C_{zz}^{(1)} \tag{5a}$$

$$\begin{bmatrix} V_{R2}(1) \\ V_{R2}(2) \\ \vdots \\ V_{R2}(n) \end{bmatrix} = C_{xx}^{(2)} \begin{bmatrix} \Delta\beta + TFoffset(1) \\ \Delta\beta + TFoffset(2) \\ \vdots \\ \Delta\beta + TFoffset(n) \end{bmatrix} + C_{zz}^{(2)} \tag{5b}$$

One set of components, $C^{(1)}$, can be solved for a first antenna using Equation 5a, and another set of components, $C^{(2)}$, can be solved for a second antenna using Equation 5b (e.g., separately). By comparing $C^{(1)}$ and $C^{(2)}$, the scaling factor SF between the first antenna and the second antenna can be obtained:

$$SF_{zz} = C_{zz}^{(1)}/C_{zz}^{(2)} \tag{6a}$$

$$SF_{xx} = C_{xx}^{(1)}/C_{xx}^{(2)} \tag{6b}$$

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a diagram of a wellbore 100 with a wellbore tool 102 that can be calibrated using a scaling factor according to one example of the present disclosure. The wellbore 100 can be formed in a subterranean formation 104 or other suitable formation (e.g., sub-oceanic, etc.). The wellbore 100 can include a casing 106 or other suitable components such as a tubing string, a workstring, etc. for accessing the wellbore 100, for extracting produced material, such as hydrocarbon material, from the wellbore 100. The wellbore tool 102 can be positioned in the wellbore 100 via a string 108 or any other suitable component that can deploy the wellbore tool 102 in the wellbore 100. In some examples, the string 108 can deploy the wellbore tool 102 via a surface component 110 such as a winch or other suitable component that can lower or otherwise deploy the wellbore tool 102 in the wellbore 100.

The wellbore tool 102 can include any suitable tool that can perform operations or otherwise make measurements in the wellbore 100. For example, the wellbore tool 102 can include a resistivity tool, a packing or isolation tool, a drilling tool, an imaging tool, other suitable wellbore tool, or any combination thereof. As illustrated in FIG. 1, the wellbore tool 102 is a tool that includes a set of electromagnetic antennas such as antennas 112a-c. The antennas 112a-c can include any suitable combination of receivers and transmitters. For example, the antennas 112a-b can be receivers, and the antenna 112c can be a transmitter. In another example, the antennas 112a-b can be transmitters, and the antenna 112c can be a receiver, etc. The antennas 112a-c can be used to perform various wellbore operations. In one such example, one or more transmitters of the antennas 112a-c can emit electromagnetic waves into the subterranean formation 104, and one or more receivers of the antennas 112a-c can receive signals from the subterranean formation 104. The signals received by the receivers can be used to determine resistivity of the subterranean formation 104, perform an inversion with respect to the subterranean formation 104, and other tasks, etc.

In some examples, the antennas 112a-b may be designed to be identical. For example, the size, shape, material, dipole moment, and other aspects of the antenna 112a may be designed to be identical to the size, shape, material, dipole moment, and other aspects of the antenna 112b, etc. But, the antennas 112a-b may not be identical, for example, due to inconsistencies in materials, manufacturing techniques, etc. Inconsistencies between the antennas 112a-b can be corrected or otherwise calibrated to increase an accuracy (e.g., compared to an accuracy resulting from not correcting or calibrating the inconsistencies) of data generated by, or operations performed by, the wellbore tool 102.

A computing device 114 can be positioned at a surface 116 of the wellbore 100. In some examples, the computing device 114 can be positioned in other suitable locations such as in the wellbore 100 (e.g., on the wellbore tool 102), remote from the wellbore 100, etc. The computing device 114 can calibrate the inconsistencies associated with the wellbore tool 102. For example, the computing device 114 can apply a scaling factor to voltages or other data received by the wellbore tool 102. In some examples, the computing device 114 can apply one or more different scaling factors to one or more different components of a tensor associated with data received by the wellbore tool 102. The scaling factor (or scaling factors) can be determined by performing a calibration of one or more of the antennas 112a-c of the wellbore tool 102 outside of the wellbore 100. For example, the wellbore tool 102 that includes the antennas 112a-c can be arranged in an airhang calibration configuration, and the computing device 114, or a separate computing device communicatively coupled to the computing device 114, can determine the scaling factor that can be used to adjust the data received by the wellbore tool 102. The computing device 114 can perform other suitable tasks for calibrating the wellbore tool 102.

The scaling factor can be used to calibrate the wellbore tool 102 for controlling a wellbore operation. The computing device 114 can apply the scaling factor (or scaling factors) to one or more measurements taken by one or more of the antennas 112a-c to generate one or more adjusted measurements. The adjusted measurements can be used to control the wellbore operation. For example, decisions regarding a drilling operation, a stimulation operation, a production operation, or other suitable wellbore operation can be made (e.g., by an operator or a computing device) based on the measurements adjusted using the scaling factor or scaling factors.

Figure 2:
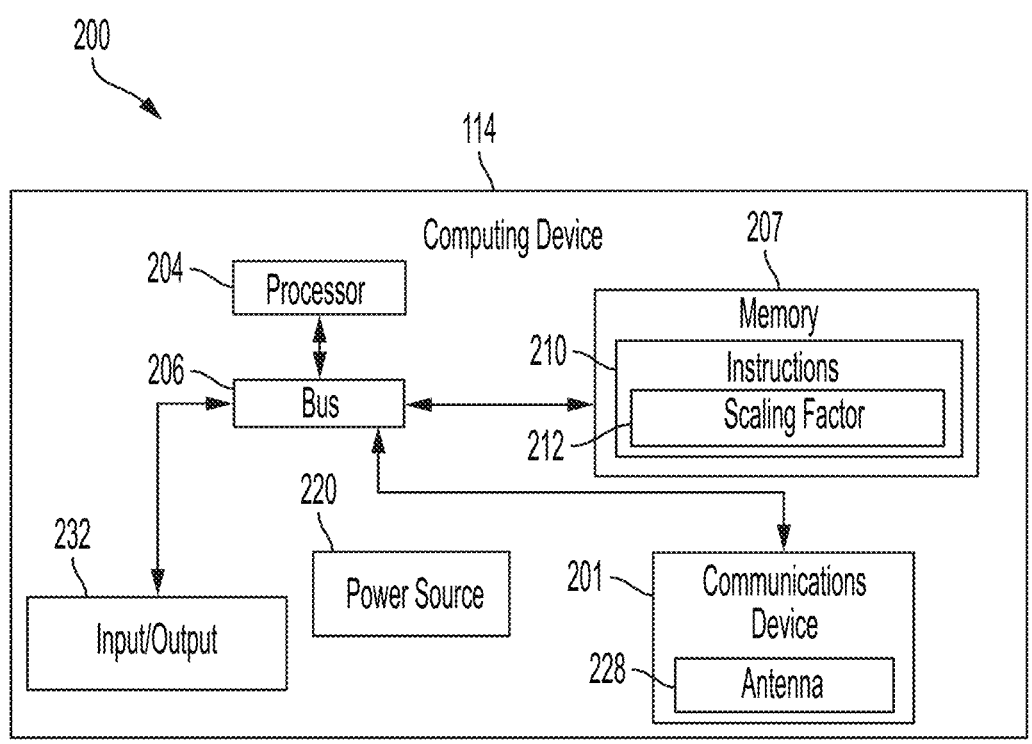
FIG. 2 is a block diagram of a computing system for determining a scaling factor for calibrating a wellbore tool according to one example of the present disclosure.

FIG. 2 is a block diagram of a computing system 200 for determining a scaling factor for calibrating a wellbore tool 102 according to one example of the present disclosure. The components shown in FIG. 2 (e.g. the computing device 114, power source 220, etc.) can be integrated into a single structure. For example, the components can be included in a single housing. In other examples, the components shown in FIG. 2 can be distributed via separate housings or otherwise, and in electrical communication with each other.

The system 200 may include the computing device 114. The computing device 114 can include a processor 204 interfaced with other hardware via a bus 206. A memory 207, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 114. In some aspects, the computing device 114 can include input/output interface components, such as a display, printer, keyboard, touch-sensitive surface, and mouse, and additional storage.

The processor 204 can execute one or more instructions 210, or operations, stored in the memory 207 for determining a scaling factor 212 for calibrating a wellbore tool 102. For example, the processor 204 can receive a first set of measurements and a second set of measurements at two respective electromagnetic antennas of the wellbore tool 102 in an airhang calibration of the wellbore tool 102. The processor 204 can decouple a first mufti-components tensor and a second multi-components tensor of the received sets of measurements and can determine the scaling factor 212 that can be used to calibrate the wellbore tool 102 or that can otherwise be used to adjust inconsistencies between the antennas 112. The processor 204 can receive a measurement from one or more of the electromagnetic antennas of the wellbore tool 102 positioned in the wellbore 100. And, the processor 204 can apply the scaling factor 212 to the measurement for correcting or otherwise improving the measurements, which can be used to invert geology of the subterranean formation 104, to determine resistivity of the subterranean formation 104, to control a wellbore operation, etc.

The instructions 210 may include other suitable instructions for determining the scaling factor 212 for adjusting or otherwise accounting for inconsistencies between the electromagnetic antennas of the wellbore tool 102. The processor 204 can execute the instructions 210 stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The memory 207 may be non-volatile and may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, Perl, Java, etc.

The computing system 200 can include a power source 220. The power source 220 can be in electrical communication with the computing device 114 that may include a communications device 222. In some examples, the power source 220 can include a battery or an electrical cable (e.g., a wireline). The power source 220 can include an AC signal generator. The computing device 114 can operate the power source 220 to apply a transmission signal to an antenna 228, in an example in which the communications device 222 is operating in a wireless mode, to forward data relating to the scaling factor 212 to other systems. For example, the computing device 114 can cause the power source 220 to apply a voltage with a frequency within a specific frequency range to the antenna 228. This can cause the antenna 228 to generate a wireless transmission. In other examples, the computing device 114, rather than the power source 220, can apply the transmission signal to the antenna 228 for generating the wireless transmission.

In some examples, part of the communications device 222 can be implemented in software. For example, the communications device 222 can include additional instructions stored in memory 207 for controlling functions of the communications device 222, The communications device 222 can receive signals from remote devices and transmit data to remote devices. For example, the communications device 222 can transmit wireless communications that are modulated by data via the antenna 228. In some examples, the communications device 222 can receive signals (e.g. associated with data to be transmitted) from the processor 204 and amplify, filter, modulate, frequency shift, or otherwise manipulate the signals. In some examples, the communications device 222 can transmit the manipulated signals to the antenna 228. The antenna 228 can receive the manipulated signals and responsively generate wireless communications that carry the data.

The computing system 200 can additionally include an input/output interface 232. The input/output interface 232 can connect to a keyboard, pointing device, display, and other computer input/output devices. An operator may provide input using the input/output interface 232. Additionally or alternatively, the operator may view outputs from the computing device 114 on the input/output interface 232. For example, the scaling factor 212, one or more multi-components tensors, and other suitable information can be displayed to the operator or a supervisor of a wellbore operation for making decisions about the wellbore operation. The wellbore operation can include an exploration operation, a stimulation operation, a drilling operation, a production operation, and the like. In some examples, scaling factor-adjusted measurements that can be displayed by the computing device 114 via the input/output interface 232 can be used to control one or more wellbore operations. For example, a fracturing operation can be controlled using data generated using the scaling factor-adjusted measurements, etc.

Figure 3:
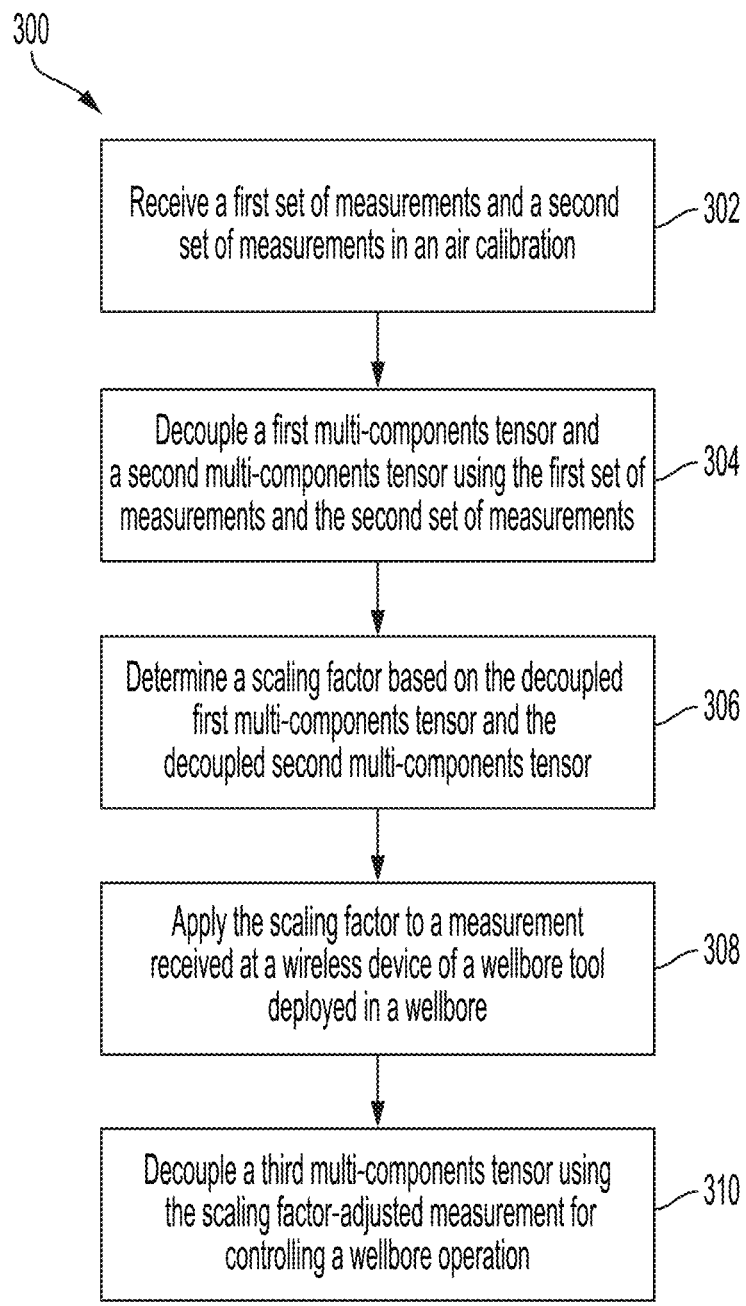
FIG. 3 is a flow chart of a process for determining a scaling factor for calibrating a wellbore tool according to one example of the present disclosure.

FIG. 3 is a flow chart of a process 300 for determining a scaling factor 212 for calibrating a wellbore tool 102 according to one example of the present disclosure. At block 302, the computing device 114 receives a first set of measurements and a second set of measurements with respect to two respective electromagnetic antennas of a wellbore tool 102. In some examples, the wellbore tool 102 can be arranged in an airhang configuration or other suitable configuration for calibration in air. The first set of measurements can include voltage readings at a first electromagnetic antenna, and the second set of measurements can include voltage readings at a second electromagnetic antenna. For example, a transmitter (e.g., the antenna 112c) can transmit signals that can be received separately at the two antennas 112a-b, and the first set of measurements and the second set of measurements can include the received signals. In some examples, the first set of measurements can involve measurements taken with a first set of azimuth angles, and the second set of measurements can involve measurements taken with a second set of azimuth angles.

The azimuth angles can be measured from the respective electromagnetic antenna to a longitudinal axis of the wellbore tool 102. In some examples, the azimuth angle, or toolface angle or offset, can be measured between the first electromagnetic antenna, or the second electromagnetic antenna, and the third electromagnetic antenna. For example, the toolface angle or offset of the antenna 112a or of the antenna 112b may be measured with respect to the antenna 112c. The azimuth angles included in the respective measurements of the antenna 112a may be different than those of the antenna 112b.

At block 304, the computing device 114 decouples a first multi-components tensor and a second multi-components tensor separately and based on the received air measurements. The computing device 114 can use the received signals, the azimuth or toolface angles or offsets, or other suitable data received with respect to the first electromagnetic antenna and the second electromagnetic antenna (e.g., antennas 112a-b) to decouple the first multi-components tensor and the second multi-components tensor. In some examples, the computing device 114 can decouple the first multi-components tensor using the first set of measurements associated with a first electromagnetic antenna, and the computing device 114 can decouple the second multi-components tensor using the second set of measurements associated with a second electromagnetic antenna.

In some examples, the computing device 114 can use Equation 5a, Equation 5b, other suitable equations, or a combination thereof to decouple or otherwise determine the first multi-components tensor and the second multi-components tensor. The tensors may each include various components such as an XX component, a ZZ component, or other suitable components. The XX component may indicate a first directional component, such as a component of the tensor associated with a traditional x-axis in three dimensions, and the ZZ component may indicate a second directional component such as a component of the tensor associated with a traditional z-axis in three dimensions.

At block 306, the computing device 114 determines a scaling factor 212. The computing device 114 can use Equation 6a, Equation 6b, or a combination thereof to determine one or more scaling factors. For example, the computing device 114 can determine a first scaling factor using a first component of the first multi-components tensor and a second component of the second multi-components tensor. Additionally, the computing device 114 can determine a second scaling factor using a third component of the first multi-components tensor and a fourth component of the second multi-components tensor. In some examples, the first component can correspond to the second component, and the third component can correspond to the fourth component. The computing device 114 can determine any other suitable scaling factors associated with any other suitable components of the tensors. In some examples, the computing device 114 can determine the scaling factor 212 based on the one or more determined scaling factors. For example, the computing device 114 can average or otherwise suitably combine the first scaling factor, the second scaling factor, and any other suitable scaling factors to determine the scaling factor 212.

At block 308, the computing device 114 applies the scaling factor 212 to one or more measurements, such as raw measurements, received by one or more of the electromagnetic antennas of the wellbore tool 102 that is positioned in the wellbore 100. Subsequent to the computing device 114 determining the scaling factor 212 based on measurements of the electromagnetic antennas (e.g., the antennas 112a-b) taken in air, the wellbore tool 102 can be positioned in the wellbore 100. The wellbore tool 102 can use the electromagnetic antennas to make or receive raw measurements, such as complex voltage measurements, and the like, with respect to the wellbore 100. The raw measurements received by one or more of the electromagnetic antennas can be adjusted by the computing device 114. For example, the computing device 114 can apply the scaling factor 212 to a raw measurement taken by an electromagnetic antenna of the wellbore tool 102 to generate an adjusted measurement. In some examples, the computing device 114 can apply the scaling factor 212 to the raw measurement by multiplying the raw measurement by the scaling factor 212, by normalizing the raw measurement with the scaling factor 212, or by performing any other suitable operation on the raw measurement using the scaling factor 212.

At block 310, the computing device 114 decouples a third multi-components tensor using the scaling-factor-adjusted measurement from the deployed wellbore tool 102. The computing device 114 can use the adjusted measurement to decouple the third multi-components tensor that is associated with the measurement to generate an adjusted, decoupled third multi-components tensor. The adjusted, decoupled third multi-components tensor can be used with respect to wellbore operations. For example, the adjusted, decoupled third multi-components tensor can be used to determine a resistivity of the wellbore 100, to invert the geology of the wellbore 100 and surrounding the wellbore tool 102, and to perform other suitable wellbore operations. In some examples, the adjusted, decoupled third multi-components tensor can be used to control a wellbore operation such as an exploration operation, a drilling operation, a stimulation operation, a production operation, or other suitable operation with respect to the wellbore 100.

Figure 4:
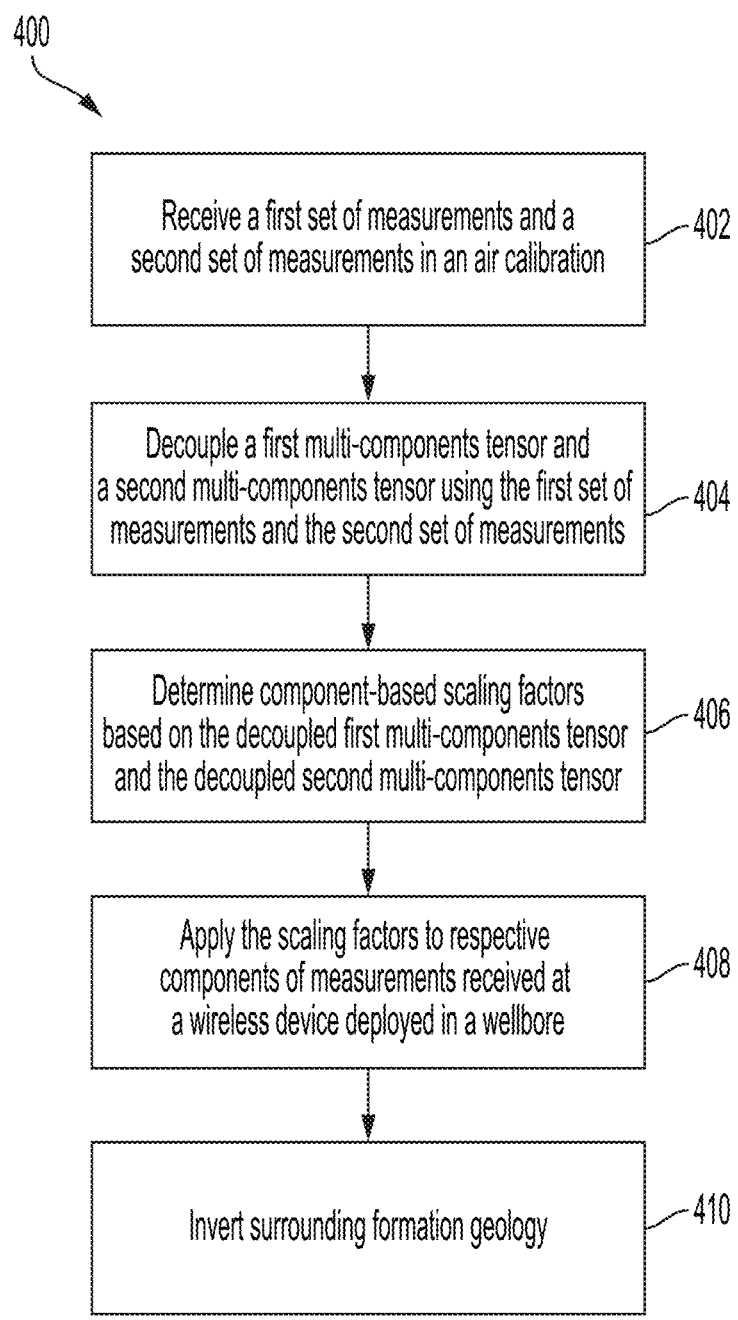
FIG. 4 is a flow chart of a process for determining and applying component-based scaling factors to calibrate a wellbore tool according to one example of the present disclosure.

FIG. 4 is a flow chart of a process for determining and applying component-based scaling factors to calibrate a wellbore tool according to one example of the present disclosure. At block 402, the computing device 114 receives a first set of measurements and a second set of measurements with respect to two respective electromagnetic antennas of a wellbore tool 102. In some examples, the wellbore tool 102 can be arranged in an airhang configuration or other suitable configuration for calibration in air. The first set of measurements can include voltage readings at a first electromagnetic antenna, and the second set of measurements can include voltage readings at a second electromagnetic antenna. For example, a transmitter (e.g., the antenna 112c) can transmit signals that can be received separately at the two antennas 112a-b, and the first set of measurements and the second set of measurements can include the received signals. In some examples, the first set of measurements can involve measurements taken with a first set of azimuth angles, and the second set of measurements can involve measurements taken with a second set of azimuth angles. In some examples, the operations performed by the computing device 114 with respect to the block 402 may be similar or identical to the operations performed by the computing device 114 with respect to the block 302 of the process 300.

At block 404, the computing device 114 decouples a first multi-components tensor and a second multi-components tensor separately and based on the received air measurements. The computing device 114 can use the received signals, the azimuth or toolface angles or offsets, or other suitable data received with respect to the first electromagnetic antenna and the second electromagnetic antenna (e.g., antennas 112a-b) to decouple the first multi-components tensor and the second multi-components tensor. In some examples, the computing device 114 can decouple the first multi-components tensor using the first set of measurements associated with a first electromagnetic antenna, and the computing device 114 can decouple the second multi-components tensor using the second set of measurements associated with a second electromagnetic antenna. In some examples, the operations performed by the computing device 114 with respect to the block 404 may be similar or identical to the operations performed by the computing device 114 with respect to the block 304 of the process 300.

At block 406, the computing device 114 determines component-based scaling factors based on the first multi-components tensor and the second multi-components tensor. In some examples, a first scaling factor may correspond to corresponding components of the decoupled first and second multi-components tensors, and a second scaling factor may correspond to different corresponding components of the decoupled first and second multi-components tensors. For example, the set of scaling factors can include (i) a first scaling factor corresponding to an XX component of the decoupled, multi-components tensors, and (ii) a second scaling factor corresponding to a ZZ component of the decoupled, multi-components tensors. In some examples, the computing device 114 can derive a first scaling factor and a second scaling factor from the component-based scaling factors. For example, the computing device 114 can derive the first scaling factor from the XX component-related scaling factor, and the computing device 114 can derive the second scaling factor from the ZZ component-related scaling factor. The component-based scaling factors can include any other suitable numbers (e.g., more than two) of scaling factors that correspond to different components of the decoupled mufti-components tensors. In some examples, the scaling factors can be determined via Equation 6a, Equation 6b, other suitable equations, or a combination thereof.

At block 408, the computing device 114 applies the scaling factors to respective components of a measurement received at one or more electromagnetic antennas of the wellbore tool 102 positioned in the wellbore 100. In some examples, the computing device 114 can apply the component-based scaling factors. Additionally or alternatively, the computing device 114 can apply the first scaling factor and the second scaling factor, which were derived from the component-based scaling factors. Subsequent to the computing device 114 determining the component-based scaling factors based on measurements of the electromagnetic antennas taken in air, the wellbore tool 102 can be positioned in the wellbore 100. The wellbore tool 102 can use the one or more electromagnetic antennas, such as receivers, to make or receive measurements, such as complex voltages, and the like, with respect to the wellbore 100. The measurements received by the electromagnetic antennas can be adjusted by the computing device 114. For example, the computing device 114 can decouple a third multi-components tensor associated with the measurements and can apply the scaling factors to the respective components of the tensor to generate an adjusted, third multi-components tensor. In some examples, the computing device 114 can apply the scaling factors to the respective components by multiplying the respective components by the respective scaling factor, by normalizing the respective components with the respective scaling factor, or by performing any other suitable operation on the respective components using the respective scaling factor.

At block 410, the computing device 114 inverts geology of the wellbore 100 surrounding the wellbore tool 102 using the scaling-factor-adjusted components of the third multi-components tensor. For example, the scaling-factor-adjusted components can be used as an input by the computing device 114 into an algorithm or other suitable model for inverting the geology of the wellbore 100. In some examples, the scaling-factor-adjusted components can be used to determine a resistivity of the wellbore 100. Additionally or alternatively, the scaling-factor-adjusted components can be used to control a wellbore operation. For example, the scaling-factor-adjusted components can be used to make decisions about or otherwise control an exploration operation, a drilling operation, a stimulation operation, a production operation, or other suitable wellbore operation with respect to the wellbore 100.

Figure 5:
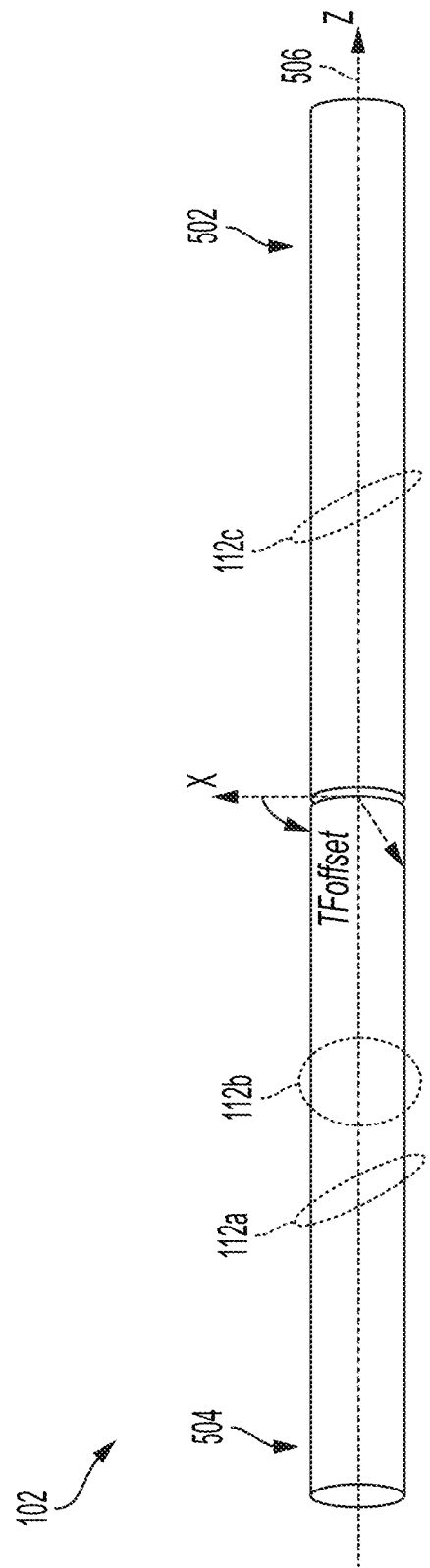
FIG. 5 is a diagram of an example of a wellbore tool that can be calibrated using a scaling factor according to one example of the present disclosure.

FIG. 5 is a diagram of an example of a wellbore tool 102 that can be calibrated using a scaling factor 212 according to one example of the present disclosure. The wellbore tool 102 can include a transmitter portion 502, a receiver portion 504, and any other suitable components. As illustrated, the transmitter portion 502 includes one electromagnetic antenna (e.g., antenna 112c), and the receiver portion 504 includes two electromagnetic antennas (e.g., antennas 112a-b). In some examples, the transmitter portion 502 can include more than one electromagnetic antenna, and the receiver portion 504 can include one electromagnetic antenna or more than two electromagnetic antennas.

The antennas 112a-c can be positioned on or otherwise with respect to the wellbore tool 102 with various azimuth or toolface angles or offsets. For example, the antenna 112c can be positioned with a first azimuth or toolface angle with respect to a longitudinal axis 506 of the wellbore tool 102, the antenna 112a can be positioned with a second azimuth or toolface angle with respect to the longitudinal axis 506, and the antenna 112b can be positioned with a third azimuth or toolface angle with respect to the longitudinal axis 506. The first toolface angle, the second toolface angle, and the third toolface angle may be similar or different.

The antennas 112a-b may be designed to be identical, such as designed to have an identical dipole moment, but defects in manufacturing or material may cause differences to exist between the antennas 112a-b. Accordingly, the differences between the antennas 112a-b can be corrected or otherwise calibrated using the scaling factor 212. For example, the computing device 114, or other suitable computing devices, can determine a scaling factor 212 between the antennas 112a-b using measurements taken with the wellbore tool 102 in air. The computing device 114 can apply the scaling factor 212 to one or more measurements taken with the wellbore tool 102 that is positioned in the wellbore 100. In some examples, such as when more than two receiver antennas are included on the wellbore tool 102, the computing device 114 can determine a separate scaling factor, or a separate set of scaling factors, for each pair of receiver antennas.

Figure 6:
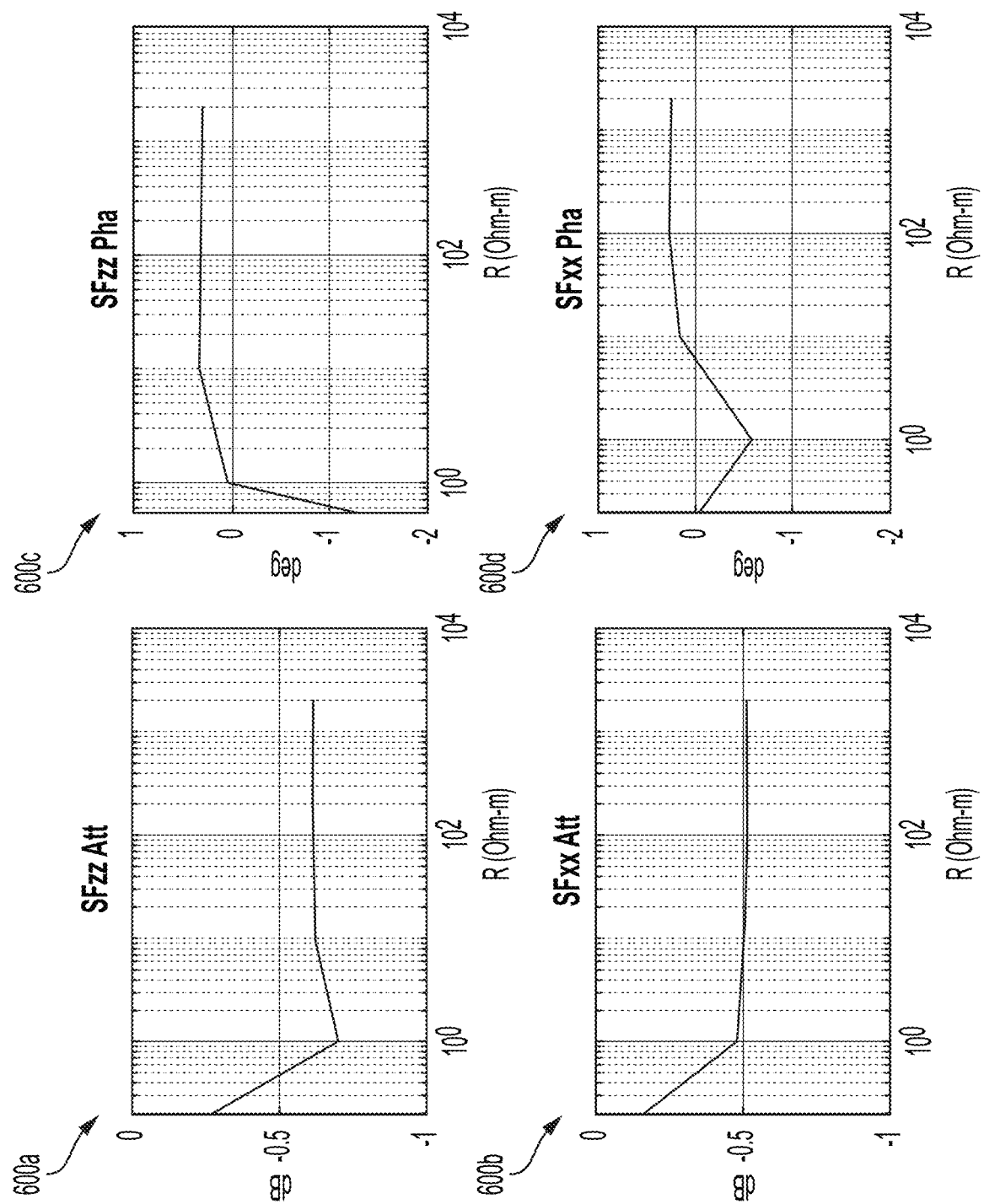
FIG. 6 is a set of plots of scaling factors for calibrating a wellbore tool according to one example of the present disclosure.

FIG. 6 is a set of plots 600a-d of scaling factors for calibrating a wellbore tool 102 according to one example of the present disclosure. As illustrated, the plots 600a-b represent scaling factors with respect to attenuation associated with measurements taken by the antennas 112a-b, and the plots 600c-d represent scaling factors with respect to phase shift associated with measurements taken by the antennas 112a-b. The horizontal axes of the plots 600a-d may represent various resistivity measurements of the wellbore 100, the vertical axes of the plots 600a-b may represent the respective scaling factors in decibels, and the vertical axes of the plots 600c-d may represent the respective scaling factors in degrees.

The plot 600a may represent a first scaling factor of a first component, such as the ZZ component, of a tensor of the measurements, and the plot 600b may represent a second scaling factor of a second component, such as the XX component, of the tensor of the measurements. The plot 600c may represent a first scaling factor of the first component of the tensor of the measurements, and the plot 600d may represent a second scaling factor of the second component of the tensor of the measurements. The plots 600a-d may indicate that the scaling factors are similar among different formation resistivities, different components of the tensor, or a combination thereof.

In some aspects, systems, methods, and non-transitory computer-readable mediums for determining a scaling factor for calibrating a wellbore tool are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving a first plurality of measurements and a second plurality of measurements, the first plurality of measurements received at a first electromagnetic antenna from a third electromagnetic antenna, the second plurality of measurements received at a second electromagnetic antenna from the third electromagnetic antenna, the first plurality of measurements associated with a first set of azimuth angles of the first electromagnetic antenna with respect to a longitudinal axis of a wellbore tool, the second plurality of measurements associated with a second set of azimuth angles of the second electromagnetic antenna with respect to the longitudinal axis, the first electromagnetic antenna and the second electromagnetic antenna positioned on the wellbore tool that is positioned in air; decoupling a first multi-components tensor and a second multi-components tensor, the first multi-components tensor corresponding to the first plurality of measurements, and the second multi-components tensor corresponding to the second plurality of measurements; determining, using the decoupled first multi-components tensor and the second multi-components tensor, a scaling factor; applying the scaling factor to: a raw measurement of the first electromagnetic antenna or the second electromagnetic antenna to generate and decouple a third multi-components tensor for controlling a wellbore operation, the first electromagnetic antenna and the second electromagnetic antenna positioned on the wellbore tool that is positioned in a wellbore for making the raw measurement; or decoupled components of a fourth multi-components tensor for controlling a wellbore operation, the fourth multi-components tensor corresponding to the raw measurements from both the first electromagnetic antenna and the second electromagnetic antenna.

Example 2 is the system of example 1, wherein the first set of azimuth angles and the second set of azimuth angles are different, and wherein the operation of determining the scaling factor includes determining the scaling factor based on the first set of azimuth angles associated with the first electromagnetic antenna and the second set of azimuth angles associated with the second electromagnetic antenna.

Example 3 is the system of example 1, wherein the operation of determining the scaling factor for raw measurements includes determining an average scaling factor by averaging a first scaling factor and a second scaling factor, wherein the operation of applying the scaling factor includes applying the averaged scaling factor to the raw measurement, and wherein the operations further comprise: determining the first scaling factor using a first component of the first multi-components tensor and a second component of the second multi-components tensor, wherein the first component corresponds to the second component; and determining the second scaling factor using a third component of the first multi-components tensor and a fourth component of the second multi-components tensor, wherein the third component corresponds to the fourth component.

Example 4 is the system of example 1, wherein the operation of determining the scaling factor includes: determining a first scaling factor using a first component of the first multi-components tensor and a second component of the second multi-components tensor, wherein the first component corresponds to the second component; and determining a second scaling factor using a third component of the first multi-components tensor and a fourth component of the second multi-components tensor, wherein the third component corresponds to the fourth component.

Example 5 is the system of any of examples 1 and 4, wherein the operation of applying the scaling factor to the decoupled components of the fourth multi-components tensor includes: determining a first component-based scaling factor and a second component-based scaling factor from a first scaling factor and a second scaling factor; applying the first component-based scaling factor to a fifth component of the fourth multi-components tensor, wherein the fifth component corresponds to the first component and the second component; and applying the second component-based scaling factor to a sixth component of the fourth multi-components tensor, wherein the sixth component corresponds to the third component and the fourth component.

Example 6 is the system of example 1; wherein the first electromagnetic antenna is a first receiver, wherein the second electromagnetic antenna is a second receiver, wherein the third electromagnetic antenna is a transmitter, wherein the first plurality of measurements and the second plurality of measurements are voltage readings at the first receiver and the second receiver, respectively, from the transmitter, and wherein the raw measurement is a complex voltage reading at the first receiver or at the second receiver.

Example 7 is the system of example 1, wherein the operations further comprise: determining, using the decoupled third multi-components tensor or the fourth multi-components tensor, a resistivity of a subterranean formation in which the wellbore is formed; inverting, using the decoupled third multi-components tensor or the fourth multi-components tensor, a geology of the subterranean formation; and controlling a wellbore operation using the resistivity and the inverted geology.

Example 8 is a method comprising: receiving a first plurality of measurements and a second plurality of measurements, the first plurality of measurements received at a first electromagnetic antenna from a third electromagnetic antenna, the second plurality of measurements received at a second electromagnetic antenna from the third electromagnetic antenna, the first plurality of measurements associated with a first set of azimuth angles of the first electromagnetic antenna with respect to a longitudinal axis of a wellbore tool, the second plurality of measurements associated with a second set of azimuth angles of the second electromagnetic antenna with respect to the longitudinal axis, the first electromagnetic antenna and the second electromagnetic antenna positioned on the wellbore tool that is positioned in air; decoupling a first multi-components tensor and a second multi-components tensor, the first multi-components tensor corresponding to the first plurality of measurements, and the second multi-components tensor corresponding to the second plurality of measurements; determining, using the decoupled first multi-components tensor and the second multi-components tensor, a scaling factor; applying the scaling factor to: a raw measurement of the first electromagnetic antenna or the second electromagnetic antenna to generate and decouple a third multi-components tensor for controlling a wellbore operation, the first electromagnetic antenna and the second electromagnetic antenna positioned on the wellbore tool that is positioned in a wellbore for making the raw measurement; or decoupled components of a fourth multi-components tensor for controlling a wellbore operation, the fourth multi-components tensor corresponding to the raw measurements from both the first electromagnetic antenna and the second electromagnetic antenna.

Example 9 is the method of example 8, wherein the first set of azimuth angles and the second set of azimuth angles are different, and wherein determining the scaling factor includes determining the scaling factor based on the first set of azimuth angles associated with the first electromagnetic antenna and the second set of azimuth angles associated with the second electromagnetic antenna.

Example 10 is the method of example 8, wherein determining the scaling factor for raw measurements includes determining an average scaling factor by averaging a first scaling factor and a second scaling factor, wherein applying the scaling factor includes applying the averaged scaling factor to the raw measurement, and wherein the method further comprises: determining the first scaling factor using a first component of the first multi-components tensor and a second component of the second multi-components tensor, wherein the first component corresponds to the second component; and determining the second scaling factor using a third component of the first multi-components tensor and a fourth component of the second multi-components tensor, wherein the third component corresponds to the fourth component.

Example 11 is the method of example 8, wherein determining the scaling factor includes: determining a first scaling factor using a first component of the first multi-components tensor and a second component of the second multi-components tensor, wherein the first component corresponds to the second component; and determining a second scaling factor using a third component of the first multi-components tensor and a fourth component of the second multi-components tensor, wherein the third component corresponds to the fourth component.

Example 12 is the method of any of examples 8 and 11, wherein applying the scaling factor to the decoupled components of the fourth multi-components tensor includes: determining a first component-based scaling factor and a second component-based scaling factor from a first scaling factor and a second scaling factor; applying the first component-based scaling factor to a fifth component of the fourth multi-components tensor, wherein the fifth component corresponds to the first component and the second component; and applying the second component-based scaling factor to a sixth component of the fourth multi-components tensor, wherein the sixth component corresponds to the third component and the fourth component.

Example 13 is the method of example 8, wherein the first electromagnetic antenna is a first receiver, wherein the second electromagnetic antenna is a second receiver, wherein the third electromagnetic antenna is a transmitter, wherein the first plurality of measurements and the second plurality of measurements are voltage readings at the first receiver and the second receiver, respectively, from the transmitter, and wherein the raw measurement is a complex voltage reading at the first receiver or at the second receiver.

Example 14 is the method of example 8, further comprising: determining, using the decoupled third multi-components tensor or the fourth multi-components tensor, a resistivity of a subterranean formation in which the wellbore is formed; inverting, using the decoupled third multi-components tensor or the fourth multi-components tensor, a geology of the subterranean formation; and controlling a wellbore operation using the resistivity and the inverted geology.

Example 15 is a non-transitory computer-readable medium comprising instructions that are executable by a processing device for causing the processing device to perform operations comprising: receiving a first plurality of measurements and a second plurality of measurements, the first plurality of measurements received at a first electromagnetic antenna from a third electromagnetic antenna, the second plurality of measurements received at a second electromagnetic antenna from the third electromagnetic antenna, the first plurality of measurements associated with a first set of azimuth angles of the first electromagnetic antenna with respect to a longitudinal axis of a wellbore tool, the second plurality of measurements associated with a second set of azimuth angles of the second electromagnetic antenna with respect to the longitudinal axis, the first electromagnetic antenna and the second electromagnetic antenna positioned on the wellbore tool that is positioned in air; decoupling a first multi-components tensor and a second multi-components tensor, the first multi-components tensor corresponding to the first plurality of measurements, and the second multi-components tensor corresponding to the second plurality of measurements; determining, using the decoupled first multi-components tensor and the second multi-components tensor, a scaling factor; applying the scaling factor to: a raw measurement of the first electromagnetic antenna or the second electromagnetic antenna to generate and decouple a third multi-components tensor for controlling a wellbore operation, the first electromagnetic antenna and the second electromagnetic antenna positioned on the wellbore tool that is positioned in a wellbore for making the raw measurement; or decoupled components of a fourth multi-components tensor for controlling a wellbore operation, the fourth multi-components tensor corresponding to the raw measurements from both the first electromagnetic antenna and the second electromagnetic antenna.

Example 16 is the non-transitory computer-readable medium of example 15, wherein the first set of azimuth angles and the second set of azimuth angles are different, and wherein the operation of determining the scaling factor includes determining the scaling factor based on the first set of azimuth angles associated with the first electromagnetic antenna and the second set of azimuth angles associated with the second electromagnetic antenna.

Example 17 is the non-transitory computer-readable medium of example 15, wherein the operation of determining the scaling factor for raw measurements includes determining an average scaling factor by averaging a first scaling factor and a second scaling factor, wherein the operation of applying the scaling factor includes applying the averaged scaling factor to the raw measurement, and wherein the operations further comprise: determining the first scaling factor using a first component of the first multi-components tensor and a second component of the second multi-components tensor, wherein the first component corresponds to the second component; and determining the second scaling factor using a third component of the first multi-components tensor and a fourth component of the second multi-components tensor, wherein the third component corresponds to the fourth component.

Example 18 is the non-transitory computer-readable medium of example 15, wherein the operation of determining the scaling factor includes: determining a first scaling factor using a first component of the first multi-components tensor and a second component of the second multi-components tensor, wherein the first component corresponds to the second component; and determining a second scaling factor using a third component of the first multi-components tensor and a fourth component of the second multi-components tensor, wherein the third component corresponds to the fourth component; and wherein the operation of applying the scaling factor to the decoupled components of the fourth multi-components tensor includes: determining a first component-based scaling factor and a second component-based scaling factor from a first scaling factor and a second scaling factor; applying the first component-based scaling factor to a fifth component of the fourth multi-components tensor, wherein the fifth component corresponds to the first component and the second component; and applying the second component-based scaling factor to a sixth component of the fourth multi-components tensor, wherein the sixth component corresponds to the third component and the fourth component.

Example 19 is the non-transitory computer-readable medium of example 15, wherein the first electromagnetic antenna is a first receiver, wherein the second electromagnetic antenna is a second receiver, wherein the third electromagnetic antenna is a transmitter, wherein the first plurality of measurements and the second plurality of measurements are voltage readings at the first receiver and the second receiver, respectively, from the transmitter, and wherein the raw measurement is a complex voltage reading at the first receiver or at the second receiver.

Example 20 is the non-transitory computer-readable medium of example 15, wherein the operations further comprise: determining, using the decoupled third multi-components tensor or the fourth multi-components tensor, a resistivity of a subterranean formation in which the wellbore is formed; inverting, using the decoupled third multi-components tensor or the fourth multi-components tensor, a geology of the subterranean formation; and controlling a wellbore operation using the resistivity and the inverted geology.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a non-transitory computer-readable medium comprising instructions that are executable by the processor to cause the processor to perform operations comprising:
receiving a first plurality of measurements and a second plurality of measurements, the first plurality of measurements received at a first electromagnetic antenna from a third electromagnetic antenna, the second plurality of measurements received at a second electromagnetic antenna from the third electromagnetic antenna, the first plurality of measurements associated with a first set of azimuth angles of the first electromagnetic antenna with respect to a longitudinal axis of a wellbore tool, the second plurality of measurements associated with a second set of azimuth angles of the second electromagnetic antenna with respect to the longitudinal axis, the first electromagnetic antenna and the second electromagnetic antenna positioned on the wellbore tool that is positioned in air;
decoupling a first multi-components tensor and a second multi-components tensor, the first multi-components tensor corresponding to the first plurality of measurements, and the second multi-components tensor corresponding to the second plurality of measurements;
determining, using the decoupled first multi-components tensor and the second multi-components tensor, a scaling factor;
applying the scaling factor to:
a raw measurement of the first electromagnetic antenna or the second electromagnetic antenna to generate and decouple a third multi-components tensor for controlling a wellbore operation, the first electromagnetic antenna and the second electromagnetic antenna positioned on the wellbore tool that is positioned in a wellbore for making the raw measurement; or
decoupled components of a fourth multi-components tensor for controlling a wellbore operation, the fourth multi-components tensor corresponding to the raw measurements from both the first electromagnetic antenna and the second electromagnetic antenna.

2. The system of claim 1, wherein the first set of azimuth angles and the second set of azimuth angles are different, and wherein the operation of determining the scaling factor includes determining the scaling factor based on the first set of azimuth angles associated with the first electromagnetic antenna and the second set of azimuth angles associated with the second electromagnetic antenna.

3. The system of claim 1, wherein the operation of determining the scaling factor for raw measurements includes determining an average scaling factor by averaging a first scaling factor and a second scaling factor, wherein the operation of applying the scaling factor includes applying the averaged scaling factor to the raw measurement, and wherein the operations further comprise:
determining the first scaling factor using a first component of the first multi-components tensor and a second component of the second multi-components tensor, wherein the first component corresponds to the second component; and
determining the second scaling factor using a third component of the first multi-components tensor and a fourth component of the second multi-components tensor, wherein the third component corresponds to the fourth component.

4. The system of claim 1, wherein the operation of determining the scaling factor includes:
determining a first scaling factor using a first component of the first multi-components tensor and a second component of the second multi-components tensor, wherein the first component corresponds to the second component; and
determining a second scaling factor using a third component of the first multi-components tensor and a fourth component of the second multi-components tensor, wherein the third component corresponds to the fourth component.

5. The system of claim 1, wherein the operation of applying the scaling factor to the decoupled components of the fourth multi-components tensor includes:
determining a first component-based scaling factor and a second component-based scaling factor from a first scaling factor and a second scaling factor;
applying the first component-based scaling factor to a fifth component of the fourth multi-components tensor, wherein the fifth component corresponds to the first component and the second component; and
applying the second component-based scaling factor to a sixth component of the fourth multi-components tensor, wherein the sixth component corresponds to the third component and the fourth component.

6. The system of claim 1, wherein the first electromagnetic antenna is a first receiver, wherein the second electromagnetic antenna is a second receiver, wherein the third electromagnetic antenna is a transmitter, wherein the first plurality of measurements and the second plurality of measurements are voltage readings at the first receiver and the second receiver, respectively, from the transmitter, and wherein the raw measurement is a complex voltage reading at the first receiver or at the second receiver.

7. The system of claim 1, wherein the operations further comprise:
determining, using the decoupled third multi-components tensor or the fourth multi-components tensor, a resistivity of a subterranean formation in which the wellbore is formed;
inverting, using the decoupled third multi-components tensor or the fourth multi-components tensor, a geology of the subterranean formation; and
controlling a wellbore operation using the resistivity and the inverted geology.

8. A method comprising:
receiving a first plurality of measurements and a second plurality of measurements, the first plurality of measurements received at a first electromagnetic antenna from a third electromagnetic antenna, the second plurality of measurements received at a second electromagnetic antenna from the third electromagnetic antenna, the first plurality of measurements associated with a first set of azimuth angles of the first electromagnetic antenna with respect to a longitudinal axis of a wellbore tool, the second plurality of measurements associated with a second set of azimuth angles of the second electromagnetic antenna with respect to the longitudinal axis, the first electromagnetic antenna and the second electromagnetic antenna positioned on the wellbore tool that is positioned in air;

decoupling a first multi-components tensor and a second multi-components tensor, the first multi-components tensor corresponding to the first plurality of measurements, and the second multi-components tensor corresponding to the second plurality of measurements;

determining, using the decoupled first multi-components tensor and the second multi-components tensor, a scaling factor;

applying the scaling factor to:
    a raw measurement of the first electromagnetic antenna or the second electromagnetic antenna to generate and decouple a third multi-components tensor for controlling a wellbore operation, the first electromagnetic antenna and the second electromagnetic antenna positioned on the wellbore tool that is positioned in a wellbore for making the raw measurement; or
    decoupled components of a fourth multi-components tensor for controlling a wellbore operation, the fourth multi-components tensor corresponding to the raw measurements from both the first electromagnetic antenna and the second electromagnetic antenna.

9. The method of claim 8, wherein the first set of azimuth angles and the second set of azimuth angles are different, and wherein determining the scaling factor includes determining the scaling factor based on the first set of azimuth angles associated with the first electromagnetic antenna and the second set of azimuth angles associated with the second electromagnetic antenna.

10. The method of claim 8, wherein determining the scaling factor for raw measurements includes determining an average scaling factor by averaging a first scaling factor and a second scaling factor, wherein applying the scaling factor includes applying the averaged scaling factor to the raw measurement, and wherein the method further comprises:

determining the first scaling factor using a first component of the first multi-components tensor and a second component of the second multi-components tensor, wherein the first component corresponds to the second component; and determining the second scaling factor using a third component of the first multi-components tensor and a fourth component of the second multi-components tensor, wherein the third component corresponds to the fourth component.

11. The method of claim 8, wherein determining the scaling factor includes:

determining a first scaling factor using a first component of the first multi-components tensor and a second component of the second multi-components tensor, wherein the first component corresponds to the second component; and determining a second scaling factor using a third component of the first multi-components tensor and a fourth component of the second multi-components tensor, wherein the third component corresponds to the fourth component.

12. The method of claim 11, wherein applying the scaling factor to the decoupled components of the fourth multi-components tensor includes:

determining a first component-based scaling factor and a second component-based scaling factor from a first scaling factor and a second scaling factor;

applying the first component-based scaling factor to a fifth component of the fourth multi-components tensor, wherein the fifth component corresponds to the first component and the second component; and applying the second component-based scaling factor to a sixth component of the fourth multi-components tensor, wherein the sixth component corresponds to the third component and the fourth component.

13. The method of claim 8, wherein the first electromagnetic antenna is a first receiver, wherein the second electromagnetic antenna is a second receiver, wherein the third electromagnetic antenna is a transmitter, wherein the first plurality of measurements and the second plurality of measurements are voltage readings at the first receiver and the second receiver, respectively, from the transmitter, and wherein the raw measurement is a complex voltage reading at the first receiver or at the second receiver.

14. The method of claim 8, further comprising:

determining, using the decoupled third multi-components tensor or the fourth multi-components tensor, a resistivity of a subterranean formation in which the wellbore is formed;

inverting, using the decoupled third multi-components tensor or the fourth multi-components tensor, a geology of the subterranean formation; and controlling a wellbore operation using the resistivity and the inverted geology.

15. A non-transitory computer-readable medium comprising instructions that are executable by a processing device for causing the processing device to perform operations comprising:

receiving a first plurality of measurements and a second plurality of measurements, the first plurality of measurements received at a first electromagnetic antenna from a third electromagnetic antenna, the second plurality of measurements received at a second electromagnetic antenna from the third electromagnetic antenna, the first plurality of measurements associated with a first set of azimuth angles of the first electromagnetic antenna with respect to a longitudinal axis of a wellbore tool, the second plurality of measurements associated with a second set of azimuth angles of the second electromagnetic antenna with respect to the longitudinal axis, the first electromagnetic antenna and the second electromagnetic antenna positioned on the wellbore tool that is positioned in air;

decoupling a first multi-components tensor and a second multi-components tensor, the first multi-components tensor corresponding to the first plurality of measurements, and the second multi-components tensor corresponding to the second plurality of measurements;

determining, using the decoupled first multi-components tensor and the second multi-components tensor, a scaling factor;

applying the scaling factor to:
    a raw measurement of the first electromagnetic antenna or the second electromagnetic antenna to generate and decouple a third multi-components tensor for controlling a wellbore operation, the first electromagnetic antenna and the second electromagnetic antenna positioned on the wellbore tool that is positioned in a wellbore for making the raw measurement; or decoupled components of a fourth multi-components tensor for controlling a wellbore operation, the fourth multi-components tensor corresponding to the raw measurements from both the first electromagnetic antenna and the second electromagnetic antenna.

16. The non-transitory computer-readable medium of claim 15, wherein the first set of azimuth angles and the second set of azimuth angles are different, and wherein the operation of determining the scaling factor includes determining the scaling factor based on the first set of azimuth angles associated with the first electromagnetic antenna and the second set of azimuth angles associated with the second electromagnetic antenna.

17. The non-transitory computer-readable medium of claim 15, wherein the operation of determining the scaling factor for raw measurements includes determining an average scaling factor by averaging a first scaling factor and a second scaling factor; wherein the operation of applying the scaling factor includes applying the averaged scaling factor to the raw measurement, and wherein the operations further comprise:
    determining the first scaling factor using a first component of the first multi-components tensor and a second component of the second multi-components tensor, wherein the first component corresponds to the second component; and
    determining the second scaling factor using a third component of the first multi-components tensor and a fourth component of the second multi-components tensor, wherein the third component corresponds to the fourth component.

18. The non-transitory computer-readable medium of claim 15, wherein the operation of determining the scaling factor includes:
    determining a first scaling factor using a first component of the first multi-components tensor and a second component of the second multi-components tensor, wherein the first component corresponds to the second component; and
    determining a second scaling factor using a third component of the first multi-components tensor and a fourth component of the second multi-components tensor, wherein the third component corresponds to the fourth component; and
wherein the operation of applying the scaling factor to the decoupled components of the fourth multi-components tensor includes:
    determining a first component-based scaling factor and a second component-based scaling factor from a first scaling factor and a second scaling factor;
    applying the first component-based scaling factor to a fifth component of the fourth multi-components tensor, wherein the fifth component corresponds to the first component and the second component; and
    applying the second component-based scaling factor to a sixth component of the fourth multi-components tensor, wherein the sixth component corresponds to the third component and the fourth component.

19. The non-transitory computer-readable medium of claim 15, wherein the first electromagnetic antenna is a first receiver, wherein the second electromagnetic antenna is a second receiver, wherein the third electromagnetic antenna is a transmitter, wherein the first plurality of measurements and the second plurality of measurements are voltage readings at the first receiver and the second receiver, respectively, from the transmitter, and wherein the raw measurement is a complex voltage reading at the first receiver or at the second receiver.

20. The non-transitory computer-readable medium of claim 15, wherein the operations further comprise:
    determining, using the decoupled third multi-components tensor or the fourth multi-components tensor, a resistivity of a subterranean formation in which the wellbore is formed;
    inverting, using the decoupled third multi-components tensor or the fourth multi-components tensor, a geology of the subterranean formation; and
    controlling a wellbore operation using the resistivity and the inverted geology.

* * * * *